United States Patent [19]
Malmin et al.

[11] Patent Number: 5,847,395
[45] Date of Patent: Dec. 8, 1998

[54] ADAPTIVE BASELINE CORRECTION FOR GAMMA CAMERA

[75] Inventors: Ronald E. Malmin, Chicago; Roger E. Arseneau, Buffalo Grove, both of Ill.

[73] Assignee: Siemens Medical Systems, Iselin, N.J.

[21] Appl. No.: 735,944

[22] Filed: Oct. 23, 1996

[51] Int. Cl.[6] .................................................. G01D 18/00
[52] U.S. Cl. ............................ 250/363.07; 250/252.1 R
[58] Field of Search ......................... 250/363.07, 363.04, 250/369, 252.1 R; 341/110, 115

[56] References Cited

U.S. PATENT DOCUMENTS 5,371,362  12/1994  Mestais et al. ................. 250/252.1 R

FOREIGN PATENT DOCUMENTS

0 706 065 A2  4/1996  European Pat. Off. .

Primary Examiner—Edward P. Westin
Assistant Examiner—Richard Hanig
Attorney, Agent, or Firm—Mark H. Jay

[57] ABSTRACT

Signal processing circuitry for use in medical imaging includes a flash analog-to-digital converter (FADC) for digitizing signals from a sensor; a memory for storing a plurality of digitized signals prior to a current event; and a processor for generating an adjustment signal from the plurality of digitized signals to adjust a first signal corresponding to the current event. In a fast time scale event processing, the signal processing circuitry generates an adjustment signal in near real-time corresponding to an analog error which is computed and updated from signals just prior to an event. In an alternative embodiment, the signal processing circuitry includes an FADC which generates the plurality of signals from a plurality of pseudo-event signals; and a digital-to-analog converter (DAC) is used for generating the pseudo-event signals between a previous event and the current event. A data fitting circuit is included for performing linear fitting of data corresponding to the plurality of signals to generate the adjustment signal. The baseline shifts and other effects of DC drift are corrected to improve event localization in the medical imaging system.

20 Claims, 7 Drawing Sheets

ADAPTIVE BASELINE CORRECTION FOR GAMMA CAMERA

BACKGROUND INFORMATION

1. Technical Field

This disclosure relates to signal level adjustment, and in particular to a system and method for adjusting for signal offsets in medical imaging equipment.

2. Description of the Related Art

Medical imaging of the organs and physical structures of patients involves sensors adapted to receive signals emitted from the patient, such as signals generated from chemical substances or physical devices emplaced within the patient. For example, in nuclear medicine, a patient is injected with a radioisotope which collects in an organ of interest, such as the heart. The radioisotope undergoes radioactive decay and emits electromagnetic radiation such as gamma rays which may be detected by an appropriate detector, such as a gamma camera. Typically, a gamma camera includes a detector which has a plurality of channels positioned such that on-axis gamma rays pass through and are detected by the detector, and off-axis rays are blocked or undetected. The radiation is thus collimated and directed onto a scintillation crystal, such as NaI doped with Tl. The gamma rays interact with the scintillation crystal to form a scintillation event, i.e. a flash of light.

An array of photodetectors, such as photomultiplier tubes (PMTs), is optically coupled to the scintillation crystal. When a PMT detects a flash of scintillation light, the PMT produces an electrical signal. By taking outputs from a group of PMTs that view a single event, the location and energy of the event may be determined. Determination of location may be done by using a center-of-gravity approach, based on the locations of the PMTs that view a particular event. A similar technique may be used to determine the energy of the emitted radiation.

In a gamma camera, whether analog or digital, the output of each sensing element, i.e. the PMTs, during a gamma ray event is combined with outputs from the other sensing elements in order to characterize the location and energy of the scintillation flash from the event. Event location may be expressed in an energy-independent form for several different event determination methods; for instance, a maximum likelihood positioning method and centroid method which use PMT signals adaptively modified are two examples of methods which may be expressed as functions of the fraction of the total event energy collected at each PMT. At high photon energies the signals are hardly affected by small direct current (DC) drifts. At clinically important lower energies, such as about 140 KeV, DC drifts may become a significant fraction of actual signals. For this reason, energy-independent operation requires very stable DC offsets, also known as "pedestals", or the ability to accurately correct for time-varying pedestals.

A fully digital gamma camera (i.e. one with an ADC associated with each PMT) generally operates with greater stability than standard analog gamma cameras, due to a decrease in the number of analog elements subject to drift. These instabilities are generally caused by physical phenomena with widely varying time scales; i.e. from very slow component-aging on the order of $O(10^6$ sec.) at one extreme, to scintillation crystal afterglow on the order of $O(10^{-6}$ sec) at the other extreme, as well as to thermally induced electronic drift at intermediate time scales. The one ADC per PMT characteristic of the digital gamma camera allows for the monitoring in time of the baseline of each PMT/ADC channel. It is the purpose of this invention to further increase stability by incorporating within the digital camera the ability to correct such drifts as they occur.

SUMMARY

The present disclosure relates to a medical imaging system and method for use with a digital gamma camera which corrects for baseline shifts to improve event localization in medical imaging systems.

In an illustrative embodiment, the medical imaging system includes signal processing circuitry using a flash analog-to-digital converter (FADC) associated with each PMT and which has all the FADC outputs sent to a bus for subsequent calculations. Slow phenomena, such as DC amplifier drift, may affect the offsets at the FADCs and therefore may affect the data into the data bus. The medical imaging system corrects event signals for such offsets.

Offset corrections are determined in this example by stepping a DAC through 8 equal steps from zero and applying this to the input of the amplifier that drives the FADC's. The output of the data value equal to the FADC value times the number of clock cycles for which the integration is done, typically 27 additions. This value is generated (typically 5000 times) at each DAC step to get good statistics on the FADC output. This gives nine data points including zero. The FADC zero error can be determined from the zero intercept of a linear fit to the points. This value, when divided by the number of integration clock cycles used to generate the integration value, is used by the correction circuit to correct the FADC output.

In one embodiment, the signal processing circuitry has a memory and a processor. The memory includes registers for storing a running sum and an increment variable. The processor integrates FADC output signals, generates a fraction of the running sum, and subtracts the fraction from the integrated FADC output signals to generate the adjustment signal. Alternatively, a queue and pointers may be used for determining the running sum.

In an alternative embodiment, the signal processing circuitry includes an FADC which generates the plurality of signals from a plurality of pseudo-event signals; and a DAC is used for generating the pseudo-event signals. A data fitting circuit is included for performing linear fitting of data corresponding to the plurality of signals to generate the adjustment signal.

BRIEF DESCRIPTION OF THE DRAWINGS

The features of the disclosed medical imaging system and method will become more readily apparent and may be better understood by referring to the following detailed description of illustrative embodiments of the present invention, taken in conjunction with the accompanying drawings, in which.

3

DESCRIPTION OF THE PREFERRED EMBODIMENTS

Figure 1:
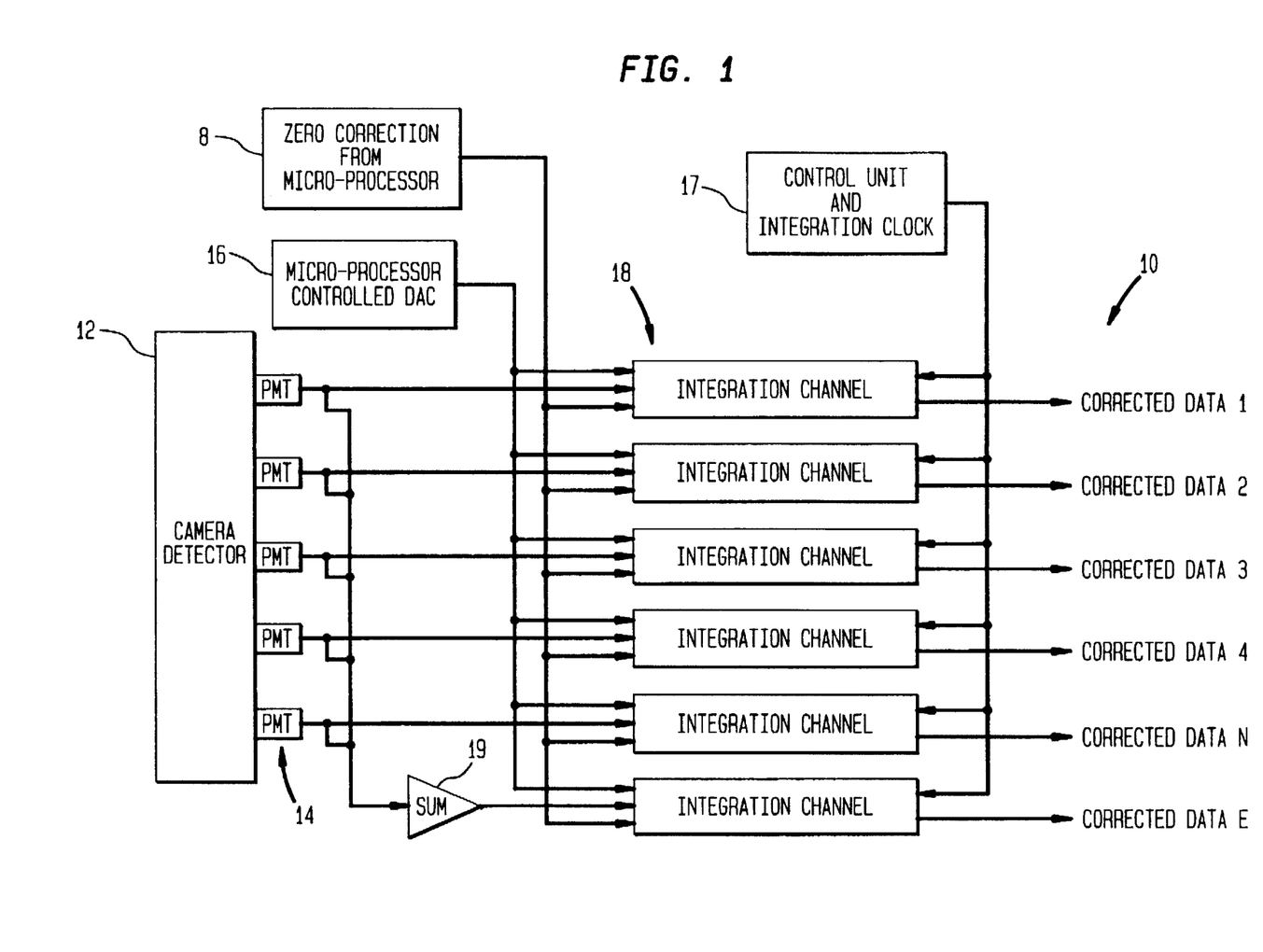
FIG. 1 is a block diagram of the portion of the disclosed medical system which produces the digital output from the sensors.

Referring now in specific detail to the drawings, with like reference numerals identifying similar or identical elements, as shown in FIG. 1, the present disclosure describes a medical imaging system 10 and method for use with a digital gamma camera which corrects for pedestal or baseline effects to improve signal detection in medical imaging.

In the illustrative embodiment shown in FIG. 1, the medical imaging system 10 receives signals corresponding to events detected by a sensor such as a camera detector 12. In one embodiment, the camera detector 12 is a gamma camera for nuclear medicine imaging. Upon detecting gamma rays by the camera 12, the corresponding scintillation events are amplified by a plurality of photodetectors such as PMTs 14 forming corresponding PMT channels for data corresponding, for example, to the orientation and location of the PMTs situated on a scintillation crystal.

The signals from the plurality of PMT channels are processed by a plurality of processing units 18 incorporating signal processing circuitry. In one embodiment, a plurality of processing units 18 may be employed, with each processing unit 18 being operatively connected to a corresponding one of PMTs 14 for dedicated adjustment of baseline signals from each corresponding PMT.

A zero correction signal is generated from a microprocessor 8 as zero correction generating means, and a microprocessor controlled digital-to-analog converter (DAC) 16 generates pseudo-event signals. An adder 19 is also include to generate a running sum of the data signals from the PMTs 14. In response to control and clock signals from a control unit and integration clock circuit 17, the processor 18 processes the zero correction signal, the pseudo-event signals, and the amplified signals from the PMTs 14 using associated integration channels to generate corrected data signals for each channel i=1 ... N, as shown in FIG. 1. In addition, an integration channel of the processor 18 receives and processes the sum from the adder 19 as well as the pseudo-event signals and the zero correction signal to generate a corrected data signal labelled CORRECTED DATA E as shown in FIG. 1.

The processing unit 18 may be implemented using an application specific integrated circuit (ASIC). Alternatively, the application may be implemented using a digital signal processor (DSP) for performing least squares linear fitting of data and for performing signal integration.

Figure 2:
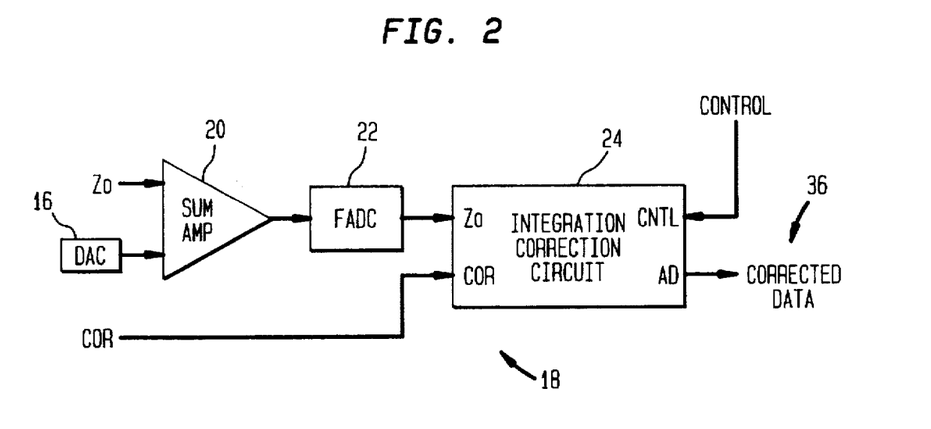
FIG. 2 is a block diagram of the integration channel for one of the sensors.

In the illustrative embodiment in FIG. 1, the processing unit 18 as shown in FIG. 2 may include a sum amplifier 20 for adding and amplifying the signals $Z_0$ from the PMT 14 and pseudo-event signals from the DAC 16, and an FADC 22 for generating digitized signals therefrom, which are processed further by a processor 24 implementing an integration/correction circuit, which may be an ASIC and/or other known processors as described above.

The integration/correction processor 24 is controlled by a control unit 17 which generates control and clock signals to control the integration/correction processor 24; for example, in response to an operating program and applications programs stored in memory included in the control unit 17. The integration/correction processor 24 uses the clock and control signals to generate signals which correct for baseline offsets and thence to generate corrected data 36 corresponding to the baseline corrected signals.

Figure 4:
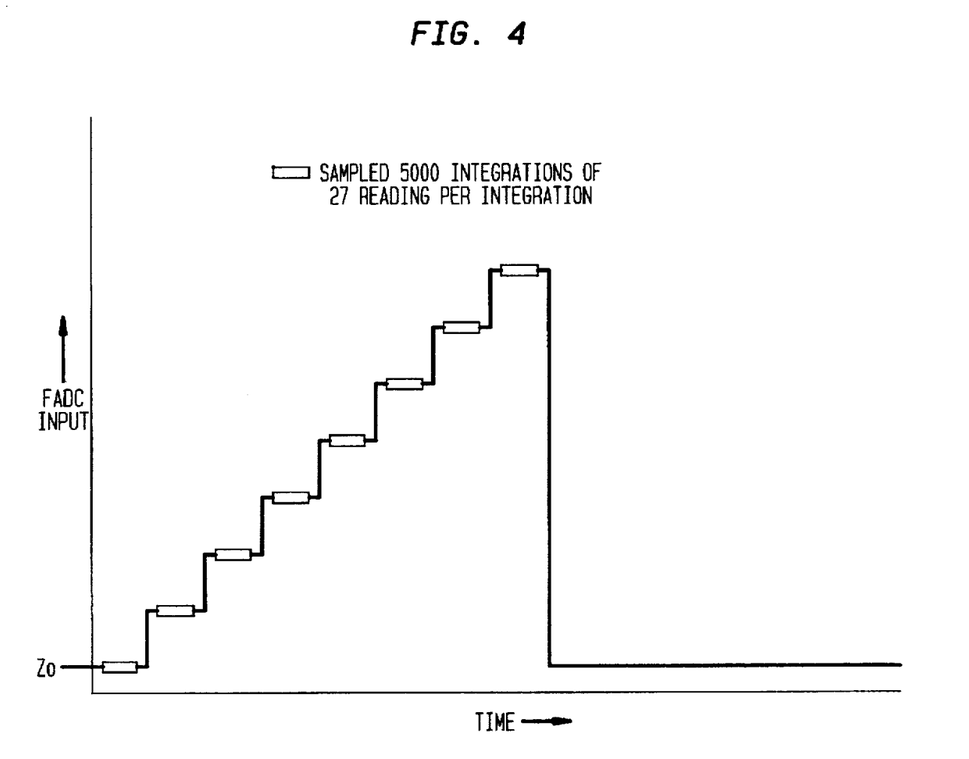
FIG. 4 shows the input voltage of the FADC vs. time as the DAC is put through its 8 steps.
Figure 5:
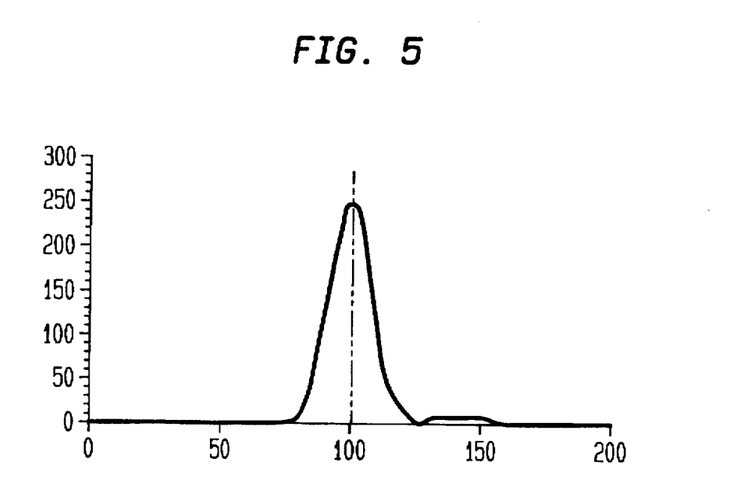
FIG. 5 shows the histogram of the 5000 data values of one of the data points of the eight DAC steps.
Figure 6:
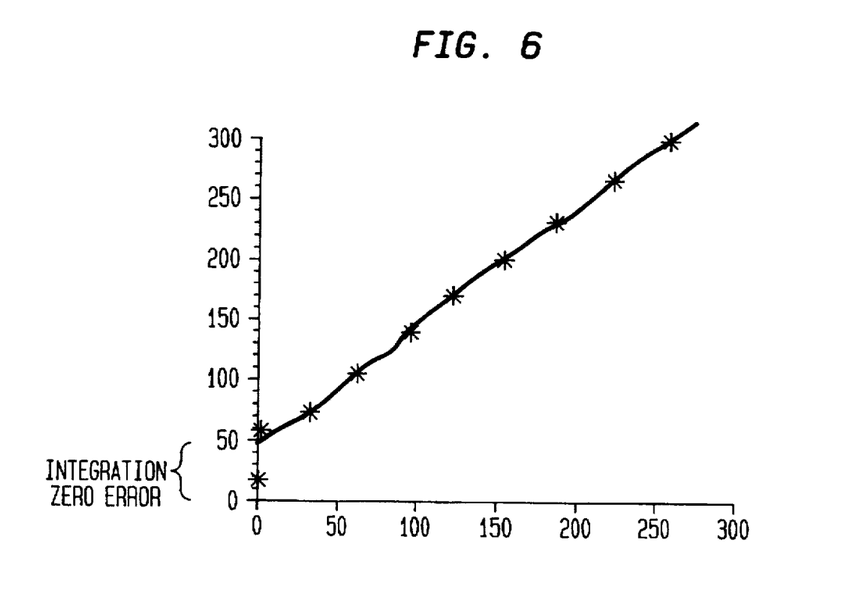
FIG. 6 shows a plot of the histogram centroids and linear fit to determine the zero intercept, which represents the zero error in the integrated value.

The operation of the integration/correction processor 24 is as follows. The FADC zero error is calculated by using a microprocessor-controlled DAC to ramp the input of the FADCs. For each step of the ramp the FADC is integrated 5000 times. Each integration is performed for a set number of cycles which is 27 in this example. The 5000 integrations for each step, corresponding to each unit of sampled integrations shown in FIG. 4, are histogrammed as shown in FIG. 5 and the center of the histogram is calculated. The calculated center of the histogram for all the DAC steps is then fitted by linear least squares and the integration zero error is determined from the zero intercept as in FIG. 6.

The integration zero error is equal to the FADC zero error times the number of integration cycles (27 in this example). So the FADC zero error is the integration zero error divided by 27. During the time that the FADC is being ramped the error register 32 would be loaded with zero so that the output data 36 would include the FADC error. The value loaded in to the error register is the value of the divide circuit 35 (in which 32 is the value in this example) times the FADC zero error. The divide circuit 35 allows correction of the FADC zero error to much less than 1 least significant bit (LSB) of the FADC. In the example the FADC zero error is multiplied by 32 allowing correction to $\frac{1}{32}$ of a FADC LSB.

Figure 7:
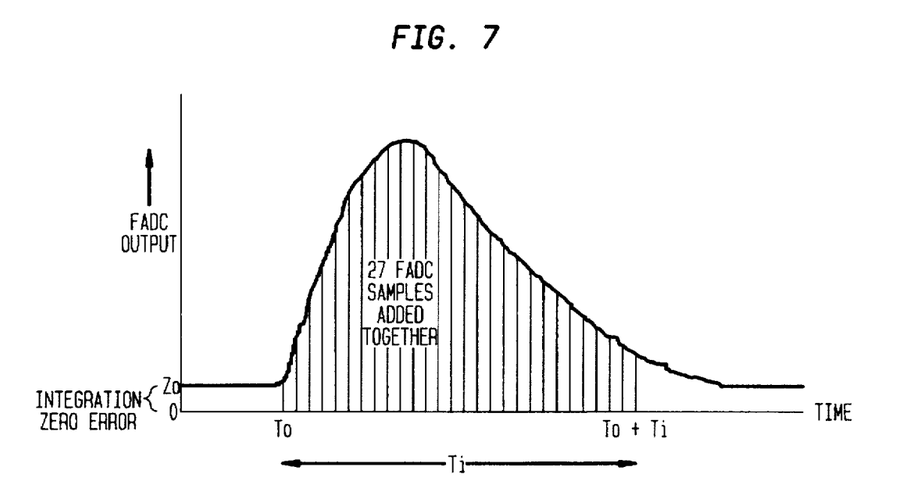
FIG. 7 shows the output of a typical FADC for an event.
Figure 8:
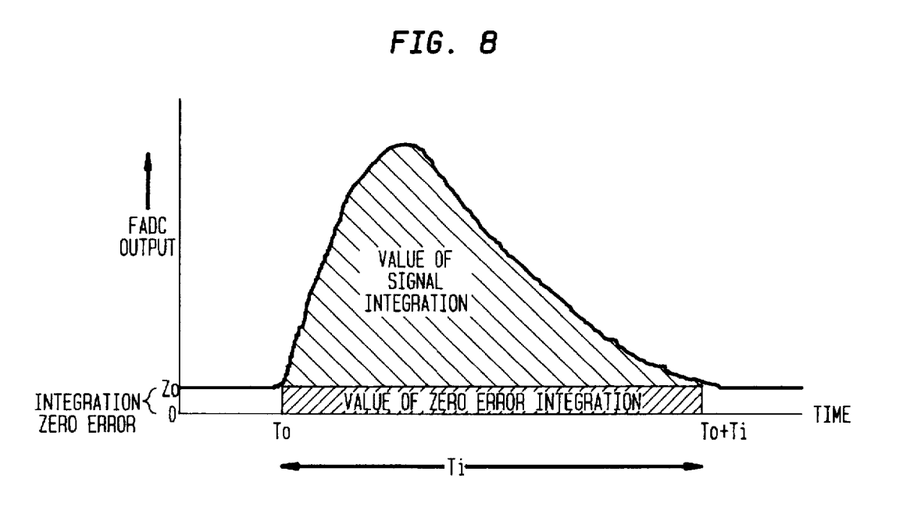
FIG. 8 shows the part of the integrated event that is real signal and the part that is error due to the FADC offset.

When an event is being integrated the integration register 31 has the sum of the signal and FADC zero for the number of cycles of the integration as illustrated in FIG. 7. The correction register has 32 times the sum FADC zero error for the number of cycles of the integration as illustrated in FIG. 8. When the integration is complete the correction register is divided by 32 and subtracted from the integration register making the output data 32 equal to the sum of the signal independent of the number of integration cycles.

The other embodiments would work in a similar way except for the method used to determine the value, COR, loaded into the error register 32. In those cases (FIG. 9) a circuit to sample the FADC output between events is employed to determine the correction value loaded into error register 32. This allows for correction of fast changing baseline errors.

Figure 3:
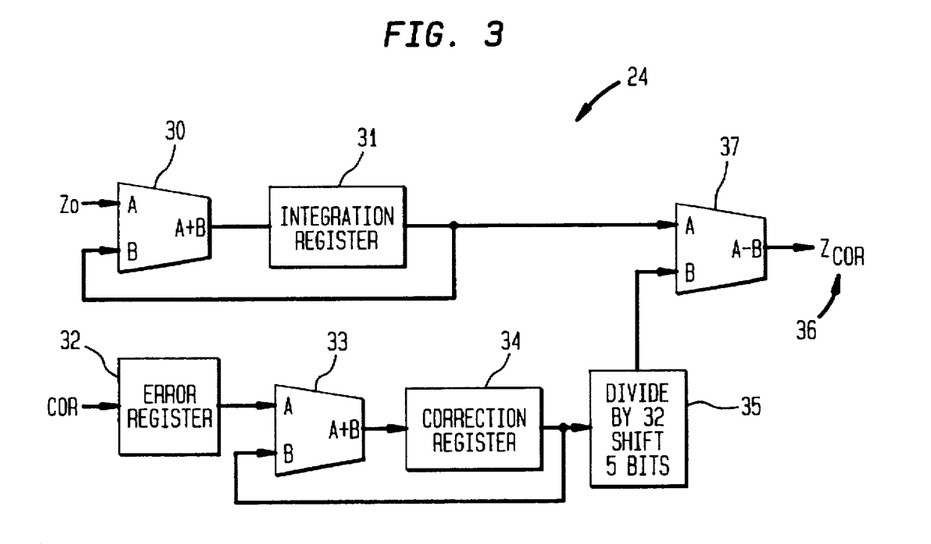
FIG. 3 is a block diagram of the integration correction circuit.

In an illustrative embodiment shown in FIG. 3, the integration/correction processor 24 is shown in greater detail, in which a first adder 30 adds the $Z_0$ signal as well as a feedback signal from an integration register 31. An error register 32 loads a correction signal COR which is applied to a second adder 33 which adds the COR signal and a feedback signal from a correction register 34. The output of the correction register 34 is divided by a divider 35 which divides the correction register output by 32; for example, the division may be performed by shifting the value by 5 bits. The output of the integration register 31 and the divider 35 are added by a third adder 37 to generated a corrected output $Z_{COR}$ 36.

The integration/correction circuit 24 provides for adaptive baseline correction to adjust such signals corresponding to fast time scale events and/or slow time scale events, depending upon the time scale over which the error register 32 is updated. Such adaptive baseline correction improves the measurement and adjustment of time-varying drift of the medical imaging system 10 on a time scale appropriate to the underlying cause, and to correct the error during the execution of the positioning method.

For pedestal variation on a fast time scale the required baseline measurement may be updated between events on a scale of milliseconds. Alternatively, for slower variations, monitoring may occur on the scale of minutes, such as in between image acquisitions or patient procedures.

For slow time scale events, slow phenomena, such as DC amplifier drift associated with the PMTs 14 or the amplifier 20, may affect the offsets at the FADCs 22 and therefore may affect the data generated from the detection by the camera 12. The medical imaging system 10, using the integration/correction processor 24, corrects for such phenomena; for example, by simulating scintillation events of different energies using a DAC, as in FIG. 4, by determining the corresponding outputs, and by generating a linear function, shown in FIGS. 5–6, relating corrections to outputs.

FAST TIME SCALE EVENT PROCESSING

For physical phenomena having characteristic times which are short compared to an image or patient-study acquisition but still much longer than that of a gamma ray event, such as the afterglow of the crystal, for the sensor; i.e. the camera 12 as well as subsequent components such as the PMTs 14 and the amplifier 20, the average DC output value measured updated, for example, prior to a current event $T_0$ (the updating need not be prior to every event) is subtracted locally from the total sensor output to yield a corrected output value. Such a procedure may be applied independently for all sensors and is not limited to gamma cameras 12, as it is applicable to any device composed of an array of sensors whose individual values may drift or change locally with time. For crystal afterglow, spatially localized corrections can be important.

Figure 9:
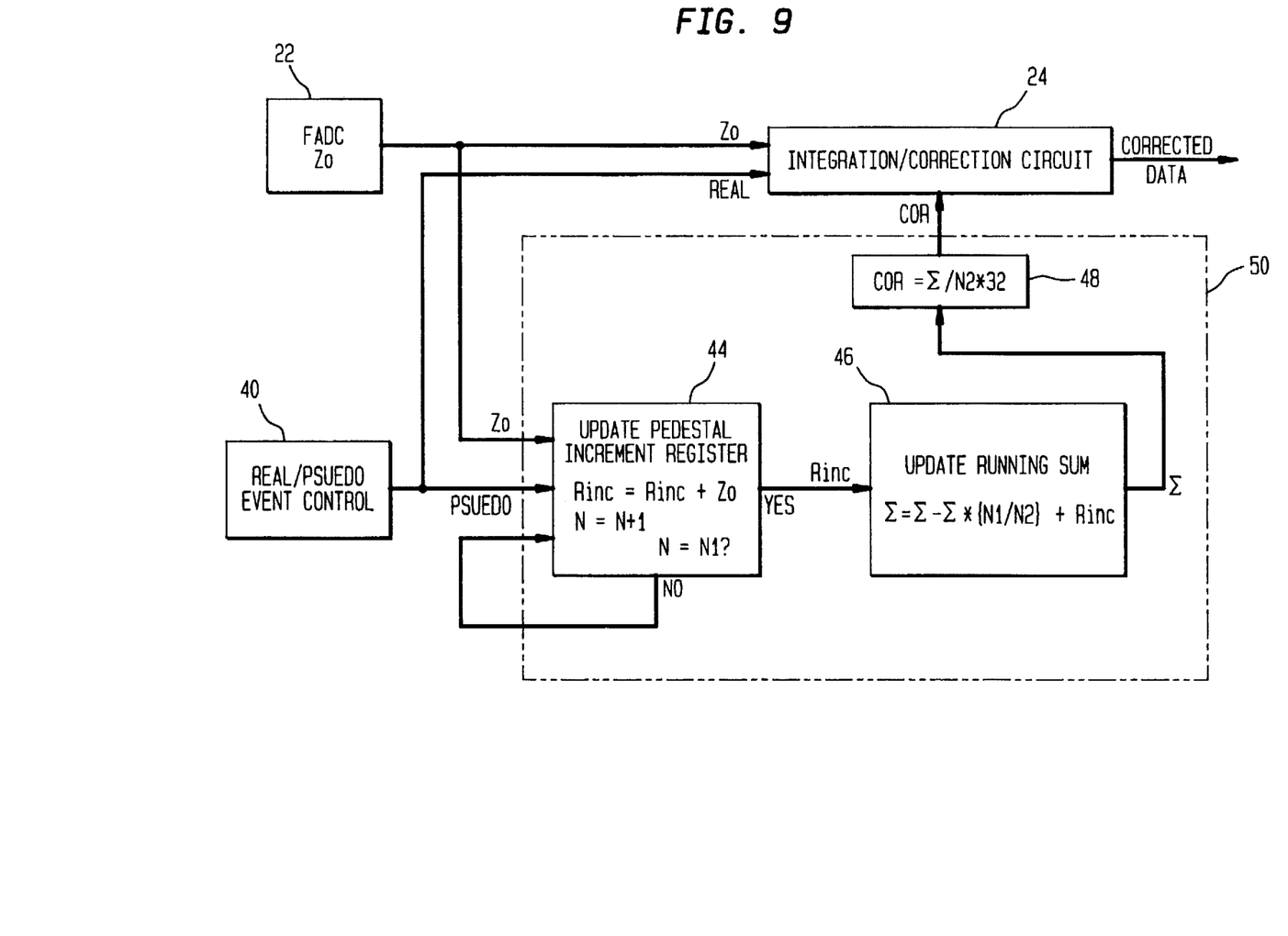
FIG. 9 is a block diagram depicting the method for maintaining a running average of the baseline values and its use as baseline correction input to the integration/correction circuit.

As shown in the flow diagram in FIG. 9, the integration/correction processor 24 receives signals, $Z_0$, from the FADC 22. If the medical imaging system has detected and is processing a real event, the output, $Z_0$, of the FADC 22 is passed directly to the integration/correction processor 24 and is processed as was described above in reference to FIG. 3.

During time intervals between real events, when the PMTs are not viewing light generated by incident X-ray or gamma rays, pseudo events are generated by the control unit 17; the FADC 22 is strobed to sample the baseline and the output, $Z_0$, of the FADC 22 is passed to an adjustment circuit 50 which generates and updates the value, COR, of error register 32 in the integration/correction processor 24.

Referring to FIG. 9, a running average of the baseline is maintained by generating a sum $\Sigma$ of the FADC output $Z_0$ over a number of FADC cycles N2 using a pair of registers for storing sum $\Sigma$ and intermediate parameter $R_{inc}$. The intermediate parameter $R_{inc}$ sums the ADC output over a shorter time interval N1. A counter N is also maintained by the integration/correction processor 24.

As shown in FIG. 9, when no actual event is present, the FADC output $Z_0$ is added to $R_{inc}$ such that $R_{inc}:=R_{inc}+Z_0$ and the counter N is incremented such that N:=N+1 using update pedestal increment register means 44, such as a set of registers. The value of N is then checked to determine if N=N1 by the means 44. If N=N1, the value of $\Sigma$ is updated using updating means 46, such as a register, by subtracting a fraction N1/N2 of $\Sigma$ from $\Sigma$, and $R_{inc}$ is added to the running sum $\Sigma$; i.e. $\Sigma:=\Sigma-\Sigma*(N1/N2)+R_{inc}$. If N≠N1, then the update pedestal increment register 44 repeats the updating so that $R_{inc}$ and N are updated until N=N1.

COR is defined as the average baseline value, $\Sigma/N2$, scaled up by a factor of 32, which is generated by scaling means 48, such as a multiplier. This updated value of COR is applied to error register 32 in the integration/correction processor 24 to generate the corrected data.

The values N1 and N2 may be powers of 2; i.e. $N1=2^{m1}$ and $N2=2^{m2}$, such that the updating means 46 determines the product $\Sigma*N1/N2=\Sigma*2^{(m1-m2)}$, which may be implemented, for example, by subtracting the upper 16–(m2–m2) bits of the register storing $\Sigma$ from itself. Similarly, the division of $\Sigma$ by N2 to generate COR by the scaling means 48 may be generated by shifting the bits in the $\Sigma$ register by m2 bit locations.

In an illustrative embodiment, for an FADC 22 running at about 30 MHz; i.e. about 33 ns. per FADC cycle, the number of FADC cycles n0 is about 27 FADC cycles; i.e. about 891 ns. are required to fully integrate a PMT pulse from an NaI scintillator crystal. If N1=n1*n0 and N2=n2*n0, then typical values for n1 and n2 are:

$$4 \leq n1 \leq 32.$$

and $$64 \leq n2 \leq 256$$

which correspond to periods for updating $\Sigma$ and $R_{inc}$, respectively, in the range of 3.6 µs to 28.6 µs for $R_{inc}$ and 57 µs to 228 µs for $\Sigma$. For [n1,n2]=[16,128], the medical imaging system 10 in FIGS. 1 and 9 provides a running average of the baseline over the previous 114 µs and updated every 16 µs. The averaging intervals and update periods determined by n1 and n2 may be corrected and chosen to adapt the medical imaging system 10 accordingly to relative time scales of baseline variation. The FADC 22 is biased so that $Z_0 \geq 0$.

In an additional embodiment, the medical imaging system 10 may implement the running average pedestal determination and adjustment therewith using pointers to a queue of events in memory. As discussed above for FIG. 9, the running average is updated by adding the sum of FADC outputs from groups of pseudo-events; i.e. other signals not generated by actual events detected by the camera 12, and by subtracting a corresponding portion of the original sum to determine the pedestal.

Figure 10:
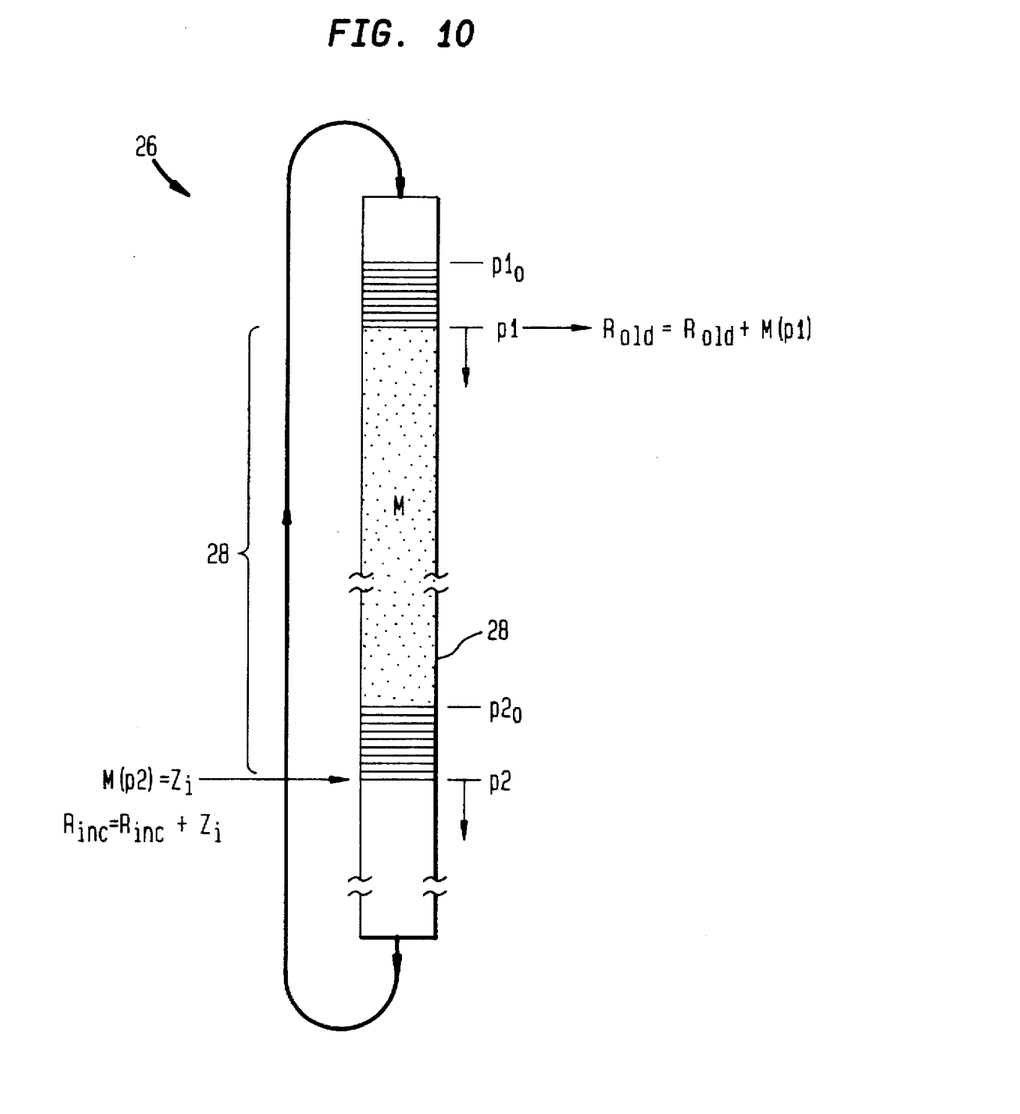
FIG. 10 is a schematic of a dynamic queue.

Using a dynamic queue 28 as shown in FIG. 10 operating in a boxcar-queuing configuration 26, determination of the pedestal by the medical imaging system 10 using the steps in FIG. 9 may be performed more accurately by subtracting the actual FADC values of "old" pseudo-events as "new" FADC values are added into the running sum. Using fast memory M and a set of pointers p1 and p2, the old pseudo-events are processed and removed from the queue 28 as new events are added. At the beginning of an update cycle, the pointer values are $p1_0$ and $p2_0$, such that the difference in the pointer values is $$(p2_0-p1_0)=N2.$$

The adjustment circuit 50 stores the running sum of FADC values from $p1_0$ to $p2_0$ in a register as $\Sigma$. When no actual event is detected by a real event/pseudo-event control unit 40, and the update cycle of pseudo-events begins, the p2 pointer is incremented to the next memory location in the queue 28, and the new FADC value $Z_0$ is written into the memory location M(p2), and summed into the register storing $R_{inc}$, using the means 44. Pointer p1 is also incremented to the next memory location in the queue 28, and the value and the memory location of p1 are summed into register storing a variable $R_{old}$; i.e.

$$R_{old}:=R_{old}+M(p1).$$

When N1 cycles have been completed, instead of using the updating means 46 in FIG. 9, the adjustment circuit 50 updates the running sum Σ such that $\Sigma := \Sigma + R_{inc} - R_{old}$. COR is then defined as before and used in the integration/correction processor 24 as described in detail above. The running sum Σ provides an improved accuracy to the determination of COR, and also uses minimal memory in the queue 28.

SLOW TIME SCALE EVENT PROCESSING

Phenomena which vary slowly in time, such as on time scales on the order of minutes or hours, include DC amplifier drift. The offsets of such phenomena may be measured when the camera 12 is not "busy"; i.e. when the camera 12 is not actively detecting actual events. In the illustrative embodiment shown in FIG. 1, the integration/correction processor 24 measures the FADC response to signals simulating events; i.e. pseudo-events, generated by a DAC 16 which are applied to an input of the FADC 22. In repeatedly applying such pseudo-event signals, with such signals corresponding to gamma ray intensities of a plurality of amplitudes, the response of the FADC 22 to such pseudo-events is used to measure the baseline offset for adjustment prior to detection of an actual event. For example, the DAC 16 may apply thousands of pseudo-events to the FADC 22, and obtain corresponding responses, such as the histogram of FADC responses shown in FIG. 5 in which the peak of the FADC response is located at about 97.0 DAC offset units.

Pedestals; i.e. DC offsets, of the FADC 22 may be determined to be the y-intercept from a linear least squares fit to the DAC sequence of pseudo-events, such as shown in FIG. 8, as determined by a data fitting circuit such as a microprocessor or DSP chip known in the art. It is understood that other curve-fitting methods may be used, such as neural networks, and so are not limited to least squares or linear fitting methods. For example, as shown in FIG. 8, in response to a plurality of pseudo-events, the integrated error pedestal of the FADC 22 is determined to be about 47 FADC offset units.

A fit of data such as a linear or approximately linear fit is made to baseline values relatively prior to the current event. In addition, previously determined baseline values may be stored in the microprocessor for use in baseline adjustment a relatively long time after such determination.

The pedestal offsets for each PMT channel may be stored in the microprocessor as the adjustment signal and applied during actual event processing or position calculation by the processing unit 18.

The processing unit 18 in FIG. 2 may also include an integrator such as the integration/correction processor 24, implemented in a manner known in the art, for integrating a plurality of signals. When signals represent two or more pulses which are piled up, the integrator/correction processor 24 performs a relatively short integration, such as 12–26 cycles of 27 total fast FADC cycles. A fraction of the full-integration pedestal, such as $12/27$ to $26/27$, is then subtracted from the short-integrated PMT output before threshold subtraction to provide improved pedestal adjustment. Since pedestal values of about 5 to about 30 FADC units are typically expected from FADCs, the calculation of fractional or floating point values is employed. The adjustment circuit 50 may also scale the effective pedestals up by a factor of 32, compute the fractional pedestal, and then scale the result back down and perform the adjustment by subtracting the scaled fractional pedestal.

While the disclosed medical imaging system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A circuit for correcting time-varying drifts of sensor based systems comprising:

an analog-to-digital converter (ADC) for digitizing signals from a sensor;

a memory for storing a plurality of digitized signals prior to a current event; and a processor for generating an adjustment signal from the plurality of digitized signals to adjust a first signal corresponding to the current event, wherein the ADC generates the plurality of signals from a plurality of pseudo-event signals and the processor includes a digital-to-analog converter (DAC) for generating the pseudo-event signals between a previous event and the current event.

2. The circuit of claim 1 further comprising:

an integrator for integrating the digitized signals corresponding to actual events, including the current event, to generate the first signal; and the processor determines a running sum of digitized signals corresponding to pseudo-events, and generates the adjustment signal from the running sum.

3. The circuit of claim 2 wherein the memory includes a first register for storing the first signal, and includes a second register for storing the running sum; and the processor generates the adjustment signal from the first and second registers.

4. The circuit of claim 3 wherein the processor includes a fraction generation circuit having at least one adder for generating the adjustment signal as a fraction of the running sum, and for subtracting the adjustment signal from the contents of the first register to generate the corrected first signal.

5. The circuit of claim 3 wherein:

the memory includes:

a queue for storing the digitized signals;

a first pointer for pointing to old digitized signals stored in the queue; and a second pointer for pointing to new digitized signals stored in the queue; and the processor generates the running sum from the old and new digitized signals.

6. The circuit of claim 3 wherein the processor includes a fraction generation circuit for generating the adjustment signal as a fraction of the running sum, and for subtracting the adjustment signal from the contents of the first register to generate the corrected first signal.

7. The circuit of claim 1 wherein the processor includes:

a data fitting circuit for performing linear fitting of data corresponding to the plurality of signals to generate the adjustment signal.

8. The circuit of claim 7 wherein the data fitting circuit generates a baseline value as the adjustment signal; and the processor adjusts the first signal by subtracting the baseline value therefrom.

9. The circuit of claim 1 wherein the processor includes:

an integrator for integrating the plurality of signals to generate a baseline value as the adjustment signal; and the processor adjusts the first signal using a predetermined fraction of the baseline value.

10. A circuit for correcting time-varying drifts of sensor based systems comprising:

a plurality of photomultiplier tubes (PMTs) for amplifying signals from a camera detector;

an adder for summing the amplified signals from the plurality of PMTs to generate a sum;

means for generating a zero correction signal;

a digital-to-analog converter (DAC) for generating pseudo-event signals; and a processor including a plurality of integration channels, each integration associated with a particular PMT and being responsive to the amplified signals from the corresponding PMT, to the sum, and to the zero correction signal, for generating corresponding corrected data signals for adjusting the time-varying drifts.

11. The circuit of claim 10 wherein:

the DAC generates the pseudo-event signals corresponding to a step of a ramp of a plurality of simulated scintillation events of different energies; and the plurality of integration channels perform 5000 integrations of 27 readings of each step of the ramp per integration cycle.

12. The circuit of claim 10 wherein the processor generates a plurality of histograms for each of the 5000 integrations of each step of the ramp.

13. The circuit of claim 12 wherein the processor determines a plurality of centers of the corresponding histograms for each step, and fits the plurality of centers using linear least square fitting techniques.

14. A gamma camera system having an adaptive baseline correction circuit comprising:

a gamma camera for receiving gamma rays corresponding to events;

a plurality of photomultiplier tube (PMT) devices, responsive to the gamma camera receiving the gamma rays, for generating corresponding signals;

a plurality of analog-to-digital converters (ADC), each being associated with a corresponding PMT, for digitizing the signals; and a processing unit including:

a memory for storing a plurality of digitized signals corresponding to events prior to a current event; and an adjustment circuit including:

an integrator for integrating the digitized signals corresponding to actual events, including the current event, to generate the first signal; and means for determining a running sum of digitized signals corresponding to pseudo-events, and for generating the adjustment signal from the running sum to adjust a first signal from at least one PMT corresponding to the current event.

15. The gamma camera system of claim 14 wherein the memory includes a first register for storing the first signal, and includes a second register for storing the running sum; and the determining means generates the adjustment signal from the first and second registers.

16. The gamma camera system of claim 15 wherein the processor includes a fraction generation circuit having at least one adder, wherein the adder generates the adjustment signal as a fraction of the running sum, and wherein the adder subtracts the adjustment signal from the contents of the first register to generate the corrected first signal.

17. The gamma camera system of claim 16 wherein:

the memory includes:

a queue for storing the digitized signals;

a first pointer for pointing to old digitized signals stored in the queue; and a second pointer for pointing to new digitized signals stored in the queue; and the determining means generates the running sum from the old and new digitized signals.

18. The gamma camera system of claim 17 wherein the determining means includes a fraction generation circuit for generating the adjustment signal as a fraction of the running sum, and for subtracting the adjustment signal from the contents of the first register to generate the corrected first signal.

19. A gamma camera system having an adaptive baseline correction circuit comprising:

a gamma camera for receiving gamma rays corresponding to events;

a plurality of photomultiplier tube (PMT) devices, responsive to the gamma camera receiving the gamma rays, for generating corresponding signals;

a plurality of analog-to-digital converters (ADC), each being associated with a corresponding one of the PMTs, for digitizing the signals corresponding to the gamma rays and for digitizing pseudo-event signals; and a processing unit including:

a memory for storing a plurality of digitized signals corresponding to events prior to a current event; and a processor having:

a digital-to-analog converter (DAC) for generating the pseudo-event signals between a previous event and the current event; and an adjustment circuit to adjust a first signal from at least one PMT corresponding to the current event.

20. The gamma camera system of claim 19 wherein the processor includes:

a data fitting circuit for performing linear fitting of data corresponding to the plurality of signals to generate the adjustment signal.

* * * * *